United States Patent
Watanabe et al.

(10) Patent No.: US 10,843,696 B2
(45) Date of Patent: Nov. 24, 2020

(54) VEHICLE SPEED CONTROL DEVICE

(71) Applicant: TOYOTA JIDOSHA KABUSHIKI KAISHA, Toyota (JP)

(72) Inventors: Yoshinori Watanabe, Isehara (JP); Tadashi Omachi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 16/131,383

(22) Filed: Sep. 14, 2018

(65) Prior Publication Data

US 2019/0118811 A1  Apr. 25, 2019

(30) Foreign Application Priority Data

Oct. 19, 2017  (JP) .................................. 2017-202594

(51) Int. Cl.
   *B60W 30/16*  (2020.01)
   *B60W 30/09*  (2012.01)
   *B60K 31/00*  (2006.01)

(52) U.S. Cl.
   CPC ....... *B60W 30/162* (2013.01); *B60K 31/0008* (2013.01); *B60W 30/09* (2013.01); *B60K 2031/0025* (2013.01); *B60K 2031/0033* (2013.01); *B60W 2520/105* (2013.01); *B60W 2554/4041* (2020.02); *B60W 2554/801* (2020.02); *B60W 2554/804* (2020.02); *B60W 2754/10* (2020.02)

(58) Field of Classification Search
   CPC .. B60W 30/14; B60W 30/143; B60W 30/146; B60W 30/16; B60W 30/162
   See application file for complete search history.

(56) References Cited

U.S. PATENT DOCUMENTS

2012/0218124 A1* 8/2012 Lee ..................... B60W 30/143
                                                                     340/904
2015/0100216 A1* 4/2015 Rayes .................. G01S 13/867
                                                                      701/96

FOREIGN PATENT DOCUMENTS

JP        2003-237407 A        8/2003

* cited by examiner

Primary Examiner — Imran K Mustafa
(74) Attorney, Agent, or Firm — Sughrue Mion, PLLC

(57) ABSTRACT

A vehicle speed control device includes: a parallel running vehicle detection sensor; and an electronic control unit configured to perform (i) cruise control, (ii) parallel running vehicle detection processing, (iii) blind zone avoidance control for controlling the speed of the vehicle such that the vehicle is moved to a position behind a blind zone of the parallel running vehicle when the parallel running vehicle is detected, (iv) blind zone getting-out determination processing for determining whether the vehicle can move to a position ahead of the blind zone by traveling according to the cruise condition, and (v) avoidance cancellation processing for prioritizing the control of the speed by the cruise control over the control of the speed by the blind zone avoidance control when it is determined by the blind zone getting-out determination processing that the vehicle can move to the position ahead of the blind zone.

7 Claims, 4 Drawing Sheets

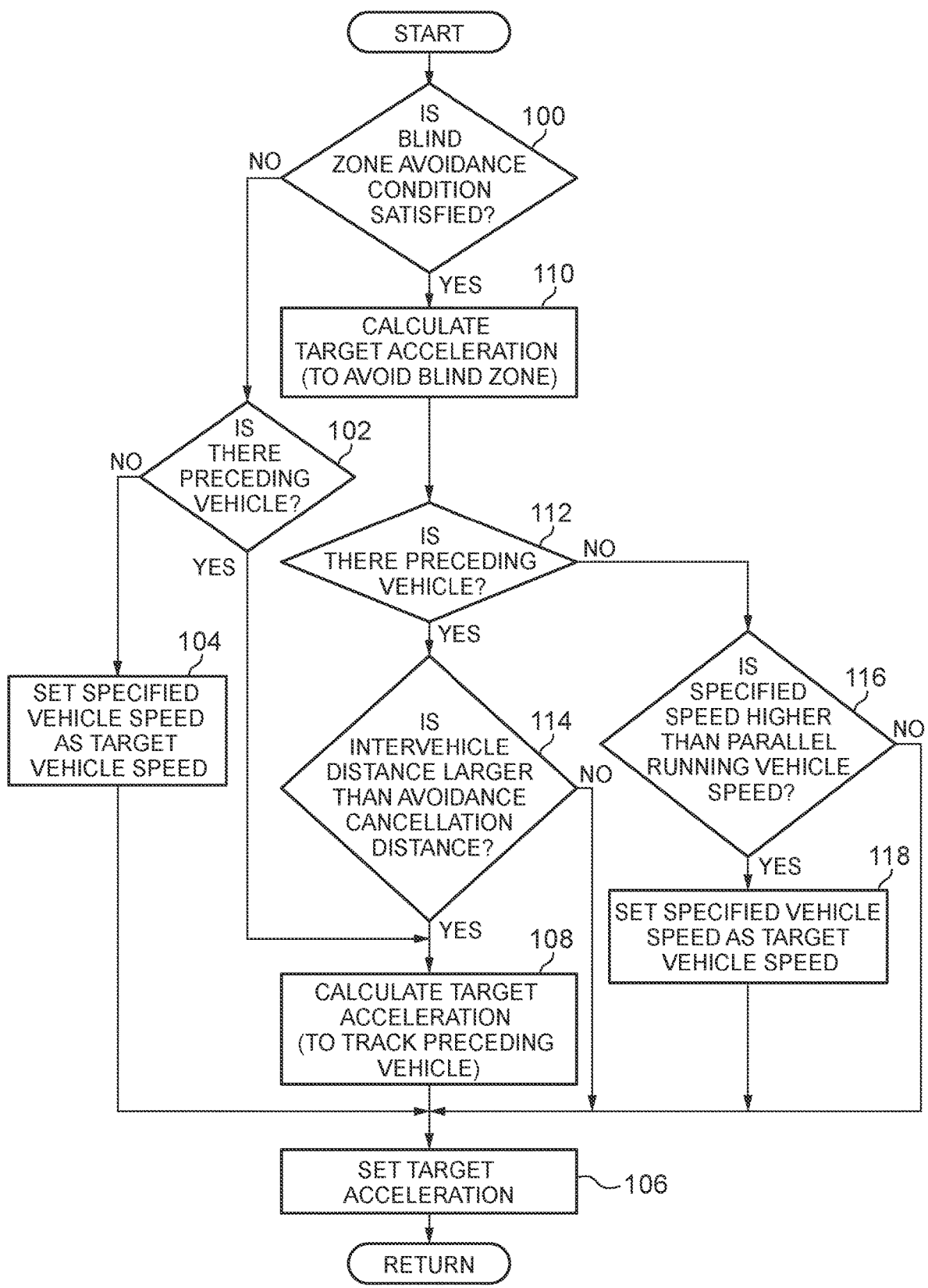

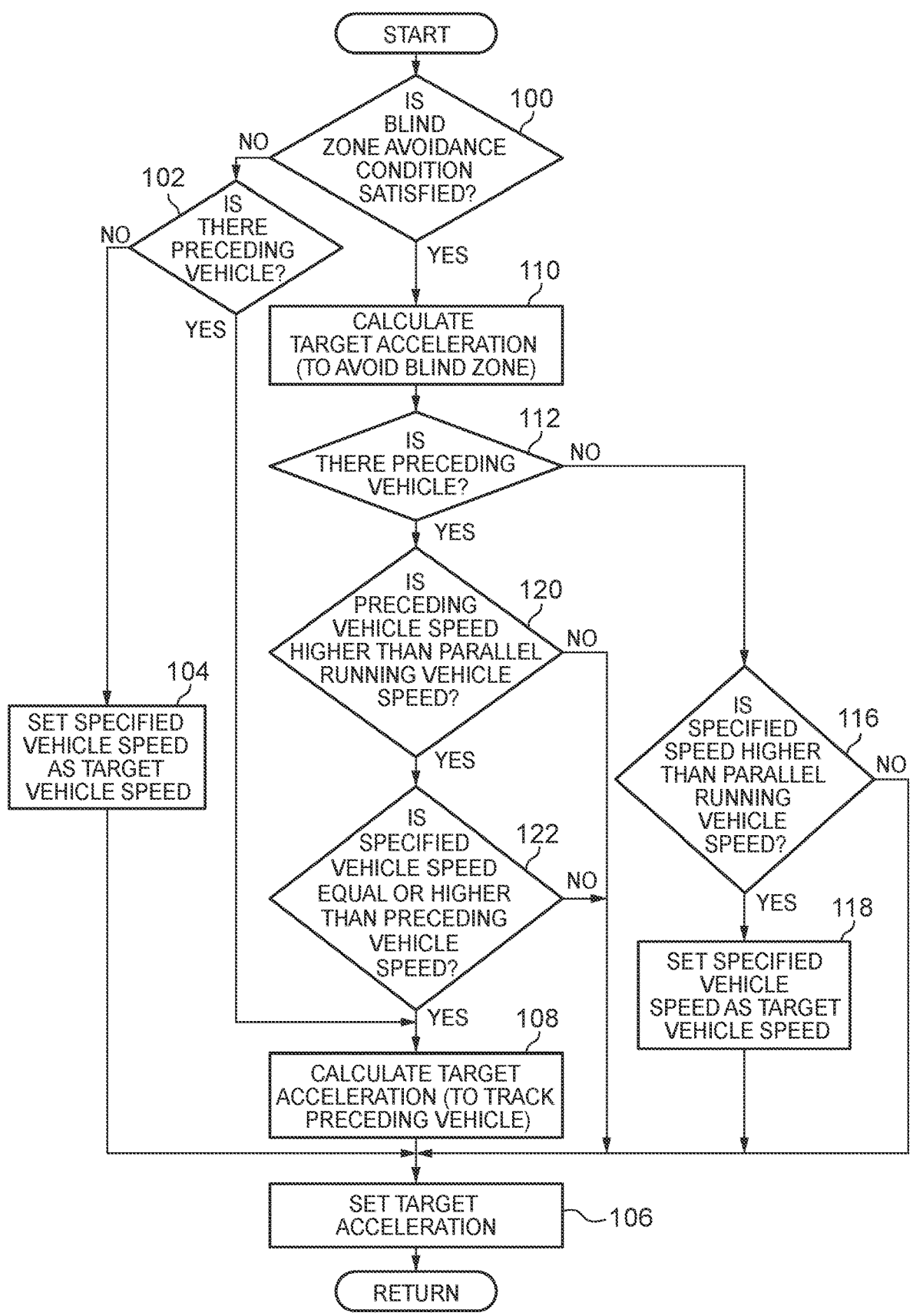

VEHICLE SPEED CONTROL DEVICE

INCORPORATION BY REFERENCE

The disclosure of Japanese Patent Application No. 2017-202594 filed on Oct. 19, 2017 including the specification, drawings and abstract is incorporated herein by reference in its entirety.

BACKGROUND

1. Technical Field

The present disclosure relates to a vehicle speed control device.

2. Description of Related Art

Japanese Patent Application Publication No. 2003-237407 (JP 2003-237407 A) discloses a vehicle speed control device having the cruise control function. This device also has a function of adjusting the target vehicle speed during the cruise control so that the position of a vehicle can get out of the blind zone of another vehicle traveling in the adjacent lane.

More specifically, the vehicle speed control device disclosed in Japanese Patent Application Publication No. 2003-237407 (JP 2003-237407 A) has sensors on the front and to the side of the vehicle for detecting a parallel running vehicle in the adjacent lane. If, during the execution of cruise control, a parallel running vehicle is detected continuously for a time exceeding the threshold value t1, the target vehicle speed is changed so that the vehicle can quickly get out of the blind zone of the parallel running vehicle.

The vehicle speed control device disclosed in Japanese Patent Application Publication No. 2003-237407 (JP 2003-237407 A) assumes two cruise control modes: constant speed traveling mode and tracking traveling mode. In the constant speed traveling mode, the vehicle speed that is manually set by the driver is used as the standard speed V0. On the other hand, in the tracking traveling mode, the standard speed V0 is set so that the inter-vehicle distance to the preceding vehicle is equal to the target distance.

In the constant speed traveling mode, if the target vehicle speed becomes higher than the standard speed V0, the driver feels that the speed is too high. In the tracking traveling mode, if the target vehicle speed becomes higher than the standard speed V0, the vehicle will approach too close to the preceding vehicle. Therefore, when a parallel running vehicle is detected in the adjacent lane, the vehicle speed control device disclosed in Japanese Patent Application Publication No. 2003-237407 (JP 2003-237407 A) changes the target vehicle speed to a value lower than the standard speed V0 to allow the vehicle to get out of the blind zone of the parallel running vehicle.

The time required for a parallel running vehicle to pass the vehicle is shorter when the target vehicle speed is reduced than when the target vehicle speed is maintained at the standard speed V0. For this reason, the device described in Japanese Patent Application Publication No. 2003-237407 (JP 2003-237407 A) makes it possible to shorten the time during which the vehicle stays in the blind zone of a parallel running vehicle during execution of cruise control.

SUMMARY

However, a parallel running vehicle may continue to travel at a speed lower than the standard speed V0. In this case, the vehicle is required to continue cruise traveling at a speed lower than the standard speed V0 over a long period of time.

In general, a driver who has requested to perform the cruise control expects that the vehicle will travel at the standard speed V0. For this reason, if the vehicle travels at a vehicle speed lower than the standard speed V0 for a long period of time, the driver is likely to feel uncomfortable with the cruise control.

The present disclosure provides a vehicle speed control device that can prevent a vehicle from staying in the blind zone of a parallel running vehicle for a long period of time while reducing the discomfort of a driver who requests to perform the cruise control.

An aspect of the disclosure provides a vehicle speed control device. The vehicle speed control device according to the aspect includes: a parallel running vehicle detection sensor configured to set an adjacent lane as a detection area, the adjacent lane being adjacent to a traveling lane where a vehicle travels; and an electronic control unit configured to control a speed of a vehicle, perform cruise control for controlling the speed of the vehicle such that a predetermined cruise condition is implemented, perform, based on an output of the parallel running vehicle detection sensor, parallel running vehicle detection processing for detecting a parallel running vehicle traveling in the adjacent lane of the vehicle, perform blind zone avoidance control for controlling the speed of the vehicle such that the vehicle is moved to a position behind a blind zone of the parallel running vehicle when the parallel running vehicle is detected during execution of the cruise control, perform blind zone getting-out determination processing for determining whether the vehicle can move to a position ahead of the blind zone by traveling according to the cruise condition, and perform avoidance cancellation processing for prioritizing the control of the speed by the cruise control over the control of the speed by the blind zone avoidance control when it is determined by the blind zone getting-out determination processing that the vehicle can move to the position ahead of the blind zone.

According to the configuration described above, if a parallel running vehicle is detected during execution of the cruise control, the vehicle is moved to a position behind the blind zone of the parallel running vehicle by the blind zone avoidance control. Therefore, it is possible avoid a situation in which the vehicle stays long in the blind zone of the parallel running vehicle during execution of the cruise control. Furthermore, according to the configuration described above, if the vehicle can move to a position ahead of the blind zone by traveling according to the cruise condition, the cruise control is performed in preference to the blind zone avoidance control. As a result, the present disclosure can prevent a passenger, who has expected that the vehicle will travel under cruise control (i.e., travel at the standard speed), from feeling uncomfortable.

In the aspect of the disclosure, the vehicle speed control device may include an inter-vehicle distance sensor configured to detect an inter-vehicle distance between the vehicle and a preceding vehicle of the vehicle in the traveling lane. The cruise control may include tracking cruise control for causing the vehicle to travel by tracking the preceding vehicle. The cruise condition may include a condition for setting the inter-vehicle distance as a target distance. The blind zone getting-out determination processing may include processing for determining, when a current inter-vehicle distance between the vehicle and the preceding vehicle is larger than a sum of the target distance and a length of the blind zone in a traveling direction of the vehicle, that the vehicle can move to the position ahead of the blind zone.

If a current inter-vehicle distance becomes larger than the sum described above, the vehicle will be seen from the parallel running vehicle at a position ahead of the blind zone when the inter-vehicle distance is reduced to the target distance. In this way, according to the configuration described above, the vehicle can quickly get out of the blind zone when the cruise control is prioritized over the blind zone avoidance control.

In the aspect of the disclosure, the vehicle speed control device may include an inter-vehicle distance sensor configured to detect an inter-vehicle distance between the vehicle and a preceding vehicle of the vehicle in the traveling lane. The cruise control may include tracking cruise control for causing the vehicle to travel by tracking the preceding vehicle. The cruise condition may include a condition for setting the inter-vehicle distance as a target distance. The blind zone getting-out determination processing may include: (i) processing for detecting a speed of the preceding vehicle; (ii) processing for detecting a speed of the parallel running vehicle; and (iii) processing for determining, when the speed of the preceding vehicle is higher than the speed of the parallel running vehicle, that the vehicle can move to the position ahead of the blind zone.

If the preceding vehicle is traveling at a higher speed than the parallel running vehicle, the vehicle inevitably moves to a position ahead of the blind zone by traveling while tracking the preceding vehicle. In this way, according to the configuration described above, when the cruise control is prioritized over the blind zone avoidance control, the vehicle can quickly get out of the blind zone.

In the aspect of the disclosure, the cruise condition may include a condition for preventing the speed of the vehicle from exceeding a specified vehicle speed, and the blind zone getting-out determination processing may include processing for determining, when the speed of the parallel running vehicle is equal to or lower than the specified vehicle speed, that the vehicle can move to the position ahead of the blind zone.

According to the configuration described above, it is possible to prevent the speed of the vehicle from exceeding the specified vehicle speed in the passing processing for moving to a position ahead of the blind zone.

In the aspect of the disclosure, the cruise control may include constant speed cruise control for causing the vehicle to travel at a specified vehicle speed. The cruise condition corresponding to the constant speed cruise control may include a condition for setting the speed of the vehicle to the specified vehicle speed. The blind zone getting-out determination processing executed under the constant speed cruise control may include processing for detecting a speed of the parallel running vehicle and processing for determining, when the specified vehicle speed is higher than the speed of the parallel running vehicle, that the vehicle can move to the position ahead of the blind zone.

If the constant speed cruise control is performed at the specified vehicle speed higher than the speed of the parallel running vehicle, the vehicle inevitably moves to a position ahead of the blind zone. Thus, according to the configuration described above, the vehicle can quickly get out of the blind zone when the constant speed cruise control is prioritized over the blind zone avoidance control.

In the aspect of the disclosure, the electronic control unit may be configured to perform, during execution of the tracking cruise control: (i) processing for determining whether there is the preceding vehicle in the traveling lane; and (ii) processing for switching the tracking cruise control to the constant speed cruise control when the preceding vehicle has gone from the traveling lane.

If the specified vehicle speed is higher than the speed of the parallel running vehicle, the passing of the parallel running vehicle is started. Therefore, according to the configuration described above, it is possible to avoid continuing the blind zone avoidance control at a low speed after the preceding vehicle has gone out of view.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart of a routine executed in the first embodiment of the present disclosure; and FIG. 5 is a flowchart of a routine executed in a second embodiment of the present disclosure.

DETAILED DESCRIPTION OF EMBODIMENTS

First Embodiment

Configuration of First Embodiment

Figure 1:
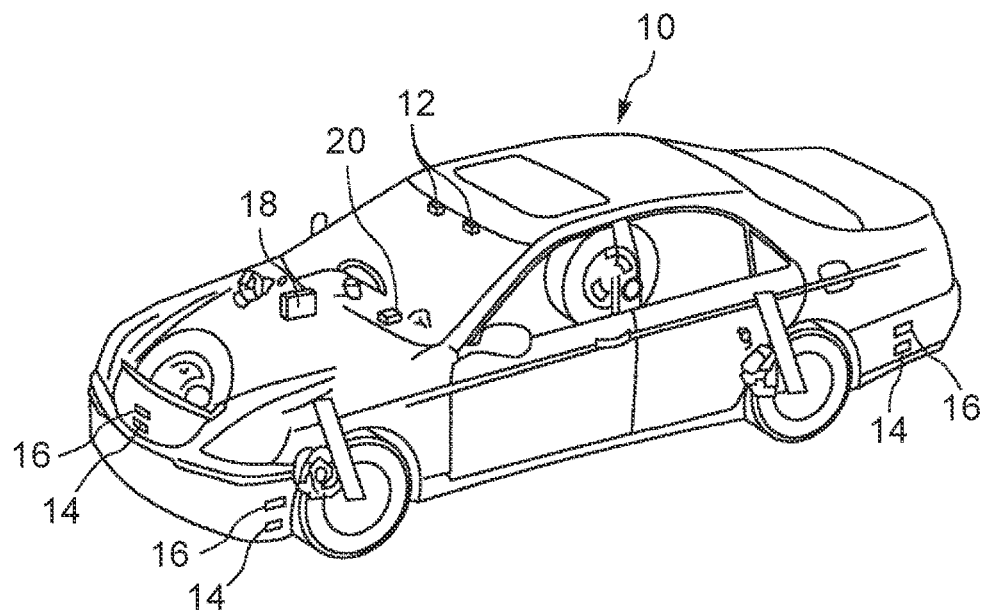
FIG. 1 is a diagram showing a configuration of a first embodiment of the present disclosure.

FIG. 1 shows a hardware configuration of a vehicle 10 on which a vehicle speed control device according to a first embodiment of the present disclosure is mounted. As shown in FIG. 1, a stereo camera 12 is mounted on the vehicle 10. The stereo camera 12 can stereoscopically capture the area ahead of the vehicle 10 at a predetermined viewing angle.

On the vehicle 10, a plurality of Laser Imaging Detection and Ranging (LIDAR) units 14 is mounted. More specifically a total of six LIDAR units 14 is mounted so that the six areas can be detected: in front of the vehicle, in front and to the left of the vehicle, in front and to the right of the vehicle, behind the vehicle, behind and to the left of the vehicle, and behind and to the right of the vehicle. The LIDAR units 14 each can detect the outline of an object that is present in each detection area as well as the distance to the object.

The vehicle 10 further includes a plurality of millimeter wave radar units 16. A total of five millimeter wave radar units 16 is mounted so that the following five ranges can be detected: in front of the vehicle, in front and to the left of the vehicle, in front and to the right of the vehicle, behind and to the left of the vehicle, and behind and to the right of the vehicle. The millimeter wave radar unit 16 can detect the distance to an object that is present in each detection area as well as the relative speed between the object and the vehicle 10. In the description below, the stereo camera 12, the LIDAR unit 14, and the millimeter wave radar unit 16 will be collectively referred to as an "object recognition sensor".

An Electronic Control Unit (ECU) 18 is mounted on the vehicle 10. The signal detected by the above-described "object recognition sensor" is supplied to the ECU 18. The ECU 18 can detect the inter-vehicle distance to the preceding vehicle that is traveling ahead of the vehicle 10, based on the signal detected by the object recognition sensor that detects an object is in the range in front of the vehicle 10. In addition, the ECU 18 can detect whether there is a parallel running vehicle in an adjacent lane which is adjacent to a traveling lane of the vehicle 10, based on the signal detected by the object recognition sensor that detects an object in the area to the side of the vehicle 10. Furthermore, the ECU 18 generates a command that determines the driving force generated by the driving source (the internal combustion engine, the motor, or both) of the vehicle 10.

A cruise control interface 20 is electrically connected to ECU 18. The ECU 18 can selectively perform one of the two types of cruise control: constant speed cruise control and tracking cruise control. The constant speed cruise control is the cruise control for causing the vehicle 10 to travel at a constant speed. The tracking cruise control is the cruise control for causing the vehicle 10 to track the preceding vehicle while maintaining the target distance Dt. The driver of the vehicle 10 can use the cruise control interface 20 to set a specified speed of the constant speed cruise control and to request the start of the cruise control.

When the start of the cruise control is requested, the ECU 18 performs the constant speed cruise control when there is no preceding vehicle. To perform the constant speed cruise control, the driving force is controlled so that the vehicle 10 travels at the specified speed described above. On the other hand, when the cruise control is requested when there is a preceding vehicle, the ECU 18 performs the tracking cruise control. To perform the tracking cruise control, the driving force is controlled so that the distance to the preceding vehicle becomes equal to the target distance Dt.

Figure 2:
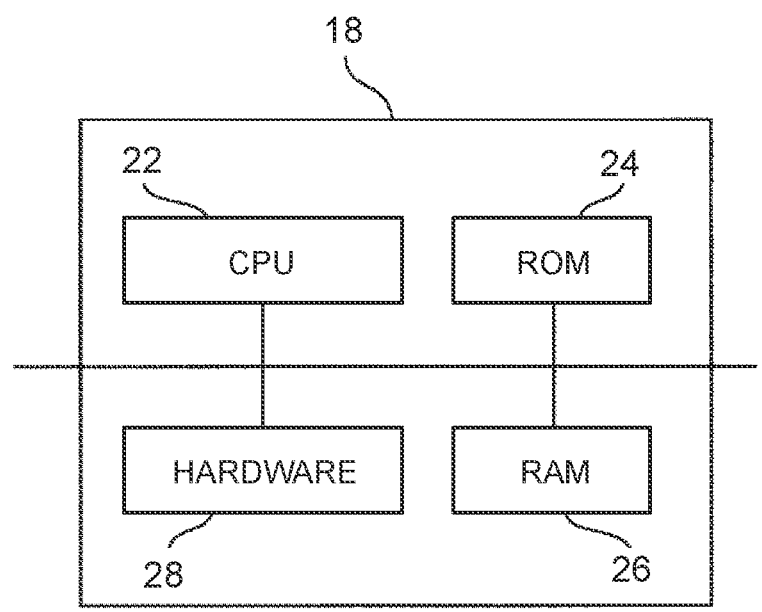
FIG. 2 is a diagram showing a configuration of the ECU shown in FIG. 1.

FIG. 2 shows a hardware configuration of the ECU 18. As shown in FIG. 2, the ECU 18 includes a processor (CPU 22 in this embodiment), memories (ROM 24 and RAM 26 in this embodiment), and a hardware circuit 28. The function of the ECU 18 is implemented by the processor that processes the software stored in the memory while using the function of the hardware circuit 28.

Features of the Vehicle Speed Control Device in this Embodiment

Figure 3:
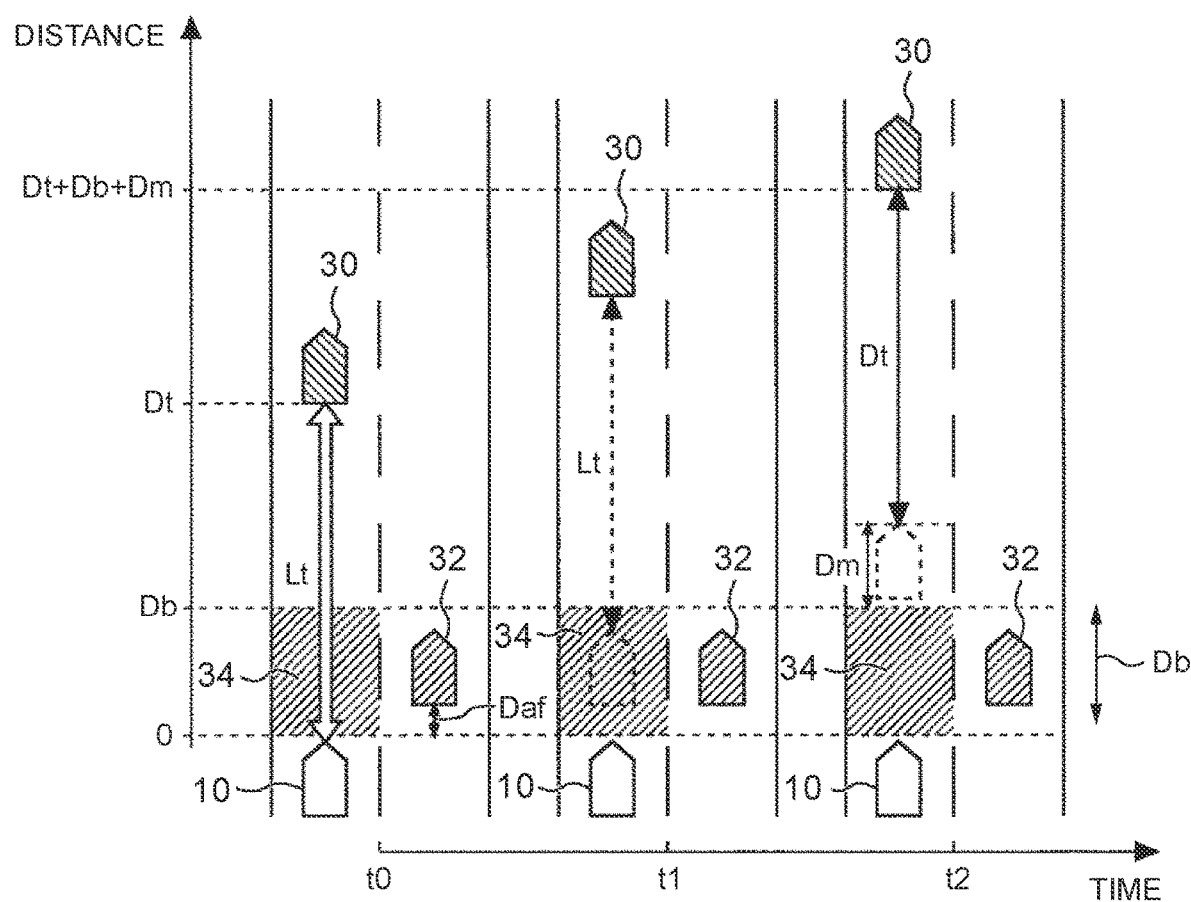
FIG. 3 is a diagram showing the features of a vehicle speed control device according to the first embodiment of the present disclosure.

FIG. 3 is a diagram showing the features of the vehicle speed control device in this embodiment. In FIG. 3, the vertical axis indicates the distance from the vehicle 10, and the horizontal axis indicates the time. More specifically, FIG. 3 shows the situation surrounding the vehicle 10 at times t0, t1 and t2. In any situation, it is assumed that the vehicle 10 is required to perform the cruise control.

At time t0, the vehicle 10 is traveling by tracking the preceding vehicle 30 under the tracking cruise control. In front and to the right side of the vehicle 10, there is a parallel running vehicle 32 that is traveling in the adjacent lane. To the side of the parallel running vehicle 32, there is a blind zone 34 that is a blind zone of the driver of the parallel running vehicle 32. In the description below, the longitudinal length of the blind zone 34 is defined as a "blind zone distance Db".

At time t0, the inter-vehicle distance between the vehicle 10 and the preceding vehicle 30 is equal to the target distance Dt and, in addition, the front end of the vehicle 10 is in line with the rear end of the blind zone 34. Such a situation occurs, for example, immediately after the parallel running vehicle 32 has passed the vehicle 10, or when the vehicle 10 has caught up with the parallel running vehicle 32. The traveling-direction distance between the vehicle 10 and the parallel running vehicle 32 at this time is indicated in FIG. 3 as "Daf".

Although not shown, when the parallel running vehicle 32 is located behind and to the right of the vehicle 10, there may be a situation in which the front end of the blind zone 34 overlaps with the rear end of the vehicle 10. The traveling-direction distance between the vehicle 10 and the parallel running vehicle 32 generated at this time is defined as "Dar". In the description below, an adjacent-lane area whose distance from the front end of the vehicle 10 in the forward direction is less than Daf and whose distance from the rear end of the vehicle 10 in the backward direction is less than Dar is referred to as a "parallel running area". In this embodiment, a vehicle that is traveling in the adjacent lane and has entered the above-described parallel running area is recognized as a "parallel running vehicle".

When the parallel running vehicle 32 is detected in the adjacent lane during execution of the cruise control, the vehicle speed control device in this embodiment assumes the blind zone 34 based on the position of the parallel running vehicle 32. The vehicle speed is then controlled so that the vehicle 10 does not stay in the blind zone 34. More specifically, as shown at time t0 in FIG. 3, the vehicle speed is controlled so that the vehicle 10 is positioned behind the blind zone 34. In the description below, this control is referred to as "blind zone avoidance control".

After time t0, during the execution of the blind zone avoidance control, the speed of the vehicle 10 is controlled at a speed at which the vehicle 10 is positioned behind the blind zone 34 even if the inter-vehicle distance to the preceding vehicle 30 becomes larger. Time t1 indicates the situation in which, if the vehicle 10 tracked the preceding vehicle 30 while keeping the target distance Dt, the vehicle 10 would fall within the blind zone 34. In this embodiment, the blind zone avoidance control is performed to cause the vehicle 10 to be positioned continuously behind the blind zone 34 at time t1. In this way, the vehicle speed control device in this embodiment prevents the vehicle 10 from staying in the blind zone 34 of the parallel running vehicle 32.

Note that the driver of the vehicle 10 who has requested the cruise control expects that the vehicle 10 will track the preceding vehicle 30 while maintaining the target distance Dt. Therefore, when the inter-vehicle distance becomes too large, the driver of the vehicle 10 feels uncomfortable. To address this problem, the vehicle speed control device according to this embodiment cancels the blind zone avoidance control if the condition for allowing the vehicle 10 to move ahead of the blind zone 34 is satisfied without breaking the condition for the cruise control.

Time t2 indicates the situation in which a space corresponding to the sum of the target distance Dt and the margin distance Dm is generated between the front end of the blind zone 34 and the preceding vehicle 30. In other words, time t2 indicates the situation in which the inter-vehicle distance between the vehicle 10 and the preceding vehicle 30 becomes equal to the "target distance Dt+margin distance Dm+blind zone distance Db". The margin distance Dm is a distance long enough for accommodating the entire length of the vehicle 10. In this situation, even if the vehicle 10 moves to a position in front of the blind zone 34, the target distance Dt can be secured between the vehicle 10 and the preceding vehicle 30. In this embodiment, the blind zone avoidance control is canceled, for example, when such a condition is satisfied.

If the blind zone avoidance control is canceled at time t2, the vehicle speed of the vehicle 10 is controlled so that the inter-vehicle distance to the preceding vehicle 30 becomes equal to the target distance Dt. As a result, the vehicle 10 can quickly pass through the blind zone 34 and then track the preceding vehicle 30 while maintaining the target distance Dt. This allows cruise traveling to be restarted so that the driver of the vehicle 10 does not feel uncomfortable.

[Processing Performed by ECU]

FIG. 4 is a flowchart of the routine executed by the ECU 18 in this embodiment for implementing the functions described above. After a specified vehicle speed is entered via the cruise control interface 20 and then the execution of cruise control is requested, the routine shown in FIG. 4 is repeatedly executed at a predetermined periodic processing interval.

In the routine shown in FIG. 4, it is determined first whether the blind zone avoidance condition is satisfied (step 100). In other words, in this step, it is determined whether the parallel running vehicle 32 is detected in the adjacent lane. More specifically, based on the output of the object detection sensor that monitors the adjacent lane, it is determined whether a vehicle is recognized in the parallel running area. In this step, an area whose distance from the front end of the vehicle 10 is less than Daf and whose distance from the rear end of the vehicle 10 is less than Dar is recognized as a parallel running area. Then, a vehicle traveling in the parallel running area is recognized as the parallel running vehicle 32.

If the parallel running vehicle 32 is not detected, it is determined that there is no need to avoid a blind zone and, therefore, the blind zone avoidance condition is not satisfied. In this case, it is determined whether, ahead of the vehicle 10, there is the preceding vehicle 30 to be tracked (step 102).

If it is determined that there is no preceding vehicle 30, the ECU 18 determines that the cruise control to be performed is the constant speed cruise control. In this case, the specified vehicle speed entered via the cruise control interface 20 is set as the target vehicle speed (step 104).

After that, the processing proceeds to step 106 and the ECU 18 sets the target acceleration and controls the driving source of the vehicle 10 so that the acceleration reaches the target acceleration. When step 106 is executed immediately after step 104, the acceleration required for converging the current speed of the vehicle 10 to the target vehicle speed is set as the target acceleration. The processing described above allows the constant speed cruise control to be performed. Note that the target acceleration is set in such a way that the target acceleration does not exceed the predetermined maximum acceleration value and that the acceleration change amount does not exceed the predetermined maximum value.

If it is determined in step 102 that there is the preceding vehicle 30, the ECU 18 determines that the cruise control to be performed is the tracking cruise control. In this case, the target acceleration required for tracking the preceding vehicle 30 while maintaining the target distance Dt is calculated (step 108). In this step, the relative speed $\Delta V$ of the vehicle 10 with respect to the preceding vehicle 30 and the difference $\Delta D$ between the target distance Dt and the current inter-vehicle distance are calculated first. Then, the acceleration that makes the relative speed $\Delta V$ zero while reducing the difference $\Delta D$ is calculated as the target acceleration. For example, when the equal acceleration motion is assumed, the target acceleration is $\Delta V^2/(2 \cdot \Delta D)$.

After that, in step 106, the driving source of the vehicle 10 is controlled based on the target acceleration that was set in step 108. In this way, the tracking cruise control is performed in the vehicle 10.

If it is determined, in step 100 of the routine shown in FIG. 4, that the blind zone avoidance condition is satisfied, the target acceleration required for the blind zone avoidance control is calculated (step 110). In this step, by virtually regarding the parallel running vehicle 32 as the preceding vehicle, the target acceleration is calculated according to the same procedure as that in step 108 described above. More specifically, the distance Daf (see time t0 in FIG. 3) for causing the vehicle 10 to move to a position behind the blind zone 34 is set as the target distance Dt between the vehicle 10 and the parallel running vehicle 32. Then, the target acceleration is calculated based on the target distance Dt and the relative speed $\Delta V$ between the vehicle 10 and the parallel running vehicle 32. The use of the target acceleration calculated in this way allows the position of the vehicle 10 to be converged to a position behind the blind zone 34 as shown at time t0 in FIG. 3.

When the processing in step 110 is finished, it is then determined whether there is the preceding vehicle 30 as in step 102 (step 112).

If it is determined that there is the preceding vehicle 30, it is determined whether the inter-vehicle distance between the vehicle 10 and the preceding vehicle 30 is larger than the "avoidance cancellation distance" (step 114). In this embodiment, the "avoidance cancellation distance" is the sum (=Dt+Dm+Db) of the distances shown at time t2 in FIG. 3, that is, the sum of the target distance Dt for the tracking cruise control, the margin distance Dm, and the blind zone distance Db.

If it is determined that the inter-vehicle distance is smaller than the avoidance cancellation distance (Dt+Dm+Db), then the processing in step 106 is performed. In step 106, the target acceleration that is currently set is used unchanged for the control. In this case, the blind zone avoidance control is enabled, and the speed of the vehicle 10 is controlled at the speed at which the vehicle 10 is moved behind the blind zone 34.

On the other hand, if it is determined in step 114 that the inter-vehicle distance is larger than the avoidance cancellation distance, it can be determined that the vehicle 10 can move to a position ahead of the blind zone 34 without approaching too close to the preceding vehicle 30. Moving to a position ahead of the blind zone 34 means that the inter-vehicle distance becomes close to the target distance Dt, satisfying the intention of the driver of the vehicle 10. Therefore, if the condition in step 114 described above is satisfied, then the processing in step 108 described above is performed.

In step 108, the target acceleration required for causing the vehicle 10 to travel while tracking the preceding vehicle 30 is set as described above. Therefore, if step 108 is performed, the blind zone avoidance control is canceled and the normal tracking cruise control is resumed. In this case, since the vehicle 10 quickly passes through the blind zone 34, the vehicle 10 never stays long in the blind zone 34. After passing through the blind zone 34, the cruise traveling that does not give a discomfort to the driver of the vehicle 10 can be performed.

If the parallel running vehicle 32 is recognized during execution of the constant speed cruise control or if the preceding vehicle 30 has gone out of view at a branch during execution of the blind zone avoidance control, it is determined in step 112 that there is no preceding vehicle 30. In this case, it is determined next whether the specified vehicle speed of the cruise control is higher than the vehicle speed of the parallel running vehicle 32 (step 116).

If the execution of the cruise control is required but there is no preceding vehicle 30, the ECU 18 performs the constant speed cruise control. In this case, if the specified vehicle speed is lower than the vehicle speed of the parallel running vehicle 32, the vehicle 10 cannot move to a position ahead of the blind zone 34 while the constant speed cruise control is performed. Therefore, if the condition in step 116 is not satisfied, the ECU 18 sets the target acceleration for the blind zone avoidance control as the final target acceleration in step 106.

On the other hand, if it is determined in step 116 that the specified vehicle speed is higher than the vehicle speed of the parallel running vehicle 32, it can be determined that the vehicle 10 can move to a position ahead of the blind zone 34 while the constant speed cruise control is performed. In this case, the ECU 18 performs the constant speed cruise control with the specified speed of the cruise control as the target speed (step 118). The processing described above can provide the cruise control that meets driver's intention while avoiding the situation in which the vehicle 10 stays long in the blind zone 34.

If the parallel running vehicle 32 is recognized in the adjacent lane while the cruise control is performed, the vehicle speed control device in this embodiment can control the speed of the vehicle 10, as described above, so that the vehicle 10 does not stay in the blind zone 34 of the parallel running vehicle 32. In addition, if the vehicle 10 can move to a position ahead of the blind zone 34 while satisfying the cruise control condition (that is, while satisfying the condition for specified vehicle speed or the target distance Dt), the blind zone avoidance control can be cancelled. Therefore, this device can provide the cruise control that is highly safe and does not give discomfort to the driver.

Modification of First Embodiment

In the first embodiment described above, a vehicle located in the parallel running area, whose distance from the front end of the vehicle 10 is less than Daf and whose distance from the rear end of the vehicle 10 is less than Dar, is defined as the parallel running vehicle 32. According to this setting, not only a vehicle whose blind zone 34 includes the whole of the vehicle 10 but also a vehicle whose blind zone 34 includes a part of the vehicle 10 is regarded as the parallel running vehicle 32. However, a vehicle whose blind zone 34 includes only a part of the vehicle 10 can visually see the rest of the vehicle 10. For this reason, such a vehicle may be excluded from the parallel running vehicle 32, and only a vehicle whose blind zone 34 includes the whose of the vehicle 10 may be defined as the parallel running vehicle 32. This also applies to a second embodiment described below.

Similarly, in the first embodiment described above, the "margin distance Dm" is included in the "avoidance cancellation distance" used in step 114. The reason for including the margin distance Dm is to secure a space for allowing the entire vehicle 10 to move to a position ahead of the blind zone 34. However, if a part of the vehicle 10 moves to a position ahead of the blind zone 34, the parallel running vehicle 32 can recognize the presence of the vehicle 10. Therefore, the avoidance cancellation distance may not include the margin distance Dm but may be the sum of the target distance Dt and the blind zone distance Db.

In the first embodiment described above, both the vehicle speed of the preceding vehicle 30 and the vehicle speed of the parallel running vehicle 32 are detected based on the output of the object recognition sensor, but the detection method is not limited to thereto. For example, these vehicle speeds may be detected via inter-vehicle communication. This also applies to a second embodiment that will be described later.

In the first embodiment described above, the blind zone avoidance control is not canceled unless the condition for allowing the vehicle 10 to move to a position ahead of the blind zone 34 is satisfied (see step 114). However, the present disclosure is not limited thereto. That is, if the inter-vehicle distance between the preceding vehicle 30 and the vehicle 10 becomes shorter than the target distance Dt during execution of the blind zone avoidance control, the blind zone avoidance control may be canceled in order to maintain the target distance Dt to allow the tracking cruise control to be resumed. This also applies to a second embodiment that will be described later.

In the first embodiment described above, the LIDAR units 14 and the millimeter wave radar units 16 arranged on the side of the vehicle 10 may function as "parallel running vehicle detection sensors", and the ECU 18 may function as the "electronic control unit". In addition, the target distance Dt that is used in the tracking cruise control and the specified vehicle speed that is used in the constant speed cruise control may be set as the "cruise condition". Furthermore, the "cruise control" may be implemented when the ECU 18 performs step 106 after performing step 104, 108 or 118, the "parallel running vehicle detection processing" may be implemented when the ECU 18 performs step 100, the "blind zone avoidance control" may be implemented when the ECU 18 performs step 106 at the target acceleration calculated in step 110, the "blind zone getting-out determination processing" may be implemented when the ECU 18 performs step 114 or step 116, and the "avoidance cancellation processing" may be implemented when the ECU 18 performs step 108 after performing step 114 or performs step 118 after performing step 116.

In the first embodiment described above, the "inter-vehicle distance sensor" may be implemented by the stereo camera 12, the LIDAR units 14 and the millimeter wave radar units 16 that monitor the area in front of the vehicle 10.

Second Embodiment

Next, a second embodiment of the present disclosure will be described with reference to FIG. 1 to FIG. 3 and FIG. 5. The second embodiment of the present disclosure has the same hardware configuration as that in the first embodiment. A vehicle speed control device in this embodiment can be implemented by causing the ECU 18 in the configuration shown in FIG. 1 to perform the routine shown in FIG. 5 instead of the routine shown in FIG. 4.

FIG. 5 is a flowchart of the routine executed by the ECU 18 in this embodiment. After a specified vehicle speed of the cruise control is set and then the execution of the cruise control is requested, the routine shown in FIG. 5 is repeatedly executed at a predetermined periodic interval in the same manner as the routine shown in FIG. 4. In the description of FIG. 5 below, the same reference numeral is used for a step similar to that in FIG. 4 and the description thereof will be omitted or simplified.

The routine shown in FIG. 5 is the same as the routine shown in FIG. 4, except that step 114 is replaced by steps 120 and 122. In the routine shown in FIG. 5, if the blind zone avoidance condition is satisfied in step 100, it is determined in step 112 whether there is the preceding vehicle 30, as in the routine shown in FIG. 4.

If it is determined as a result of step 112 that there is the preceding vehicle 30, it is determined whether the speed of the preceding vehicle 30 is higher than the speed of the parallel running vehicle 32 (step 120). If the vehicle 10 is going to move to a position ahead of the blind zone 34 when the speed of the preceding vehicle 30 is lower than the speed of the parallel running vehicle, the inter-vehicle distance between the preceding vehicle 30 and the vehicle 10 is inevitably reduced. In this case, there is a possibility that the inter-vehicle distance becomes shorter than the target distance Dt and, as a result, the vehicle 10 becomes too close to the preceding vehicle 30. Therefore, in this situation, it is desirable to quickly move the vehicle 10 to a position behind the blind zone 34.

If the condition in step 120 is not satisfied for the reason described above, then the processing in step 106 is performed. In this case, since the blind zone avoidance control is maintained, the vehicle 10 can quickly move to a position behind the blind zone 34.

If it is determined in step 120 above that the speed of the preceding vehicle 30 is higher than the speed of the parallel running vehicle 32, it can be determined that the vehicle 10 can move to a position ahead of the blind zone 34 by continuing the tracking cruise control. In this case, it is further determined whether the speed of the preceding vehicle 30 is equal to or lower than the specified vehicle speed of the vehicle 10 (step 122).

If the speed of the preceding vehicle 30 is higher than the specified vehicle speed, the speed of the vehicle 10 cannot be adjusted to the speed of the preceding vehicle 30 within the range of the specified speed. In this case, there is a possibility that the vehicle 10 cannot move to a position ahead of the blind zone 34 within the range of the speed limit of the cruise control. Therefore, if the condition in step 122 is not satisfied, the ECU 18 quickly perform step 106 so as to give priority to the blind zone avoidance control.

On the other hand, if it is determined that the speed of the preceding vehicle 30 is equal to or lower than the specified vehicle speed, it can be determined that the vehicle 10 can pass the parallel running vehicle 32 within the range of the specified speed. That is, it can be determined that the vehicle 10 can move to a position ahead of the blind zone 34 by traveling according to the cruise control condition. In this case, the ECU 18 performs the processing in step 108 next so as to avoid the blind zone avoidance control and to give priority to the tracking cruise control.

When the processing in step 108 is performed, the driving source of the vehicle 10 is controlled in step 106, which follows, at the target acceleration required for tracking the preceding vehicle 30. As a result, the vehicle 10 quickly moves to a position ahead of the blind zone 34 by traveling while tracking the preceding vehicle 30. As described above, the vehicle speed control device in this embodiment can achieve the same effect as that of the first embodiment using a method different from that used in the first embodiment.

In the second embodiment described above, if it is determined in step 122 that the specified vehicle speed is equal to or higher than the preceding vehicle speed, the processing is performed for the vehicle 10 to move to a position ahead of the blind zone 34. However, in this case, it can also be determined whether the specified vehicle speed is higher than the parallel running vehicle speed. According to the method described in the second embodiment, if the relation "preceding vehicle speed>specified speed" is satisfied, that is, if the vehicle 10 cannot travel at the same speed as the preceding vehicle 30, the vehicle 10 cannot move to a position ahead of the blind zone 34. On the other hand, according to the modification, if the relation "preceding vehicle speed>specified vehicle speed>parallel running vehicle speed" is satisfied, that is, if the vehicle 10 cannot travel at the same speed as the preceding vehicle 30 but can pass the parallel running vehicle 32, the vehicle 10 moves to a position ahead of the blind zone 34. In the latter case, the behavior of the vehicle 10 can be matched more closely with the intention of a driver who requests the cruise control.

In the second embodiment described above, the ECU 18 may perform step 120 and step 122, or perform step 116, to implement the "blind zone getting-out determination processing", and may perform step 120 and step 122 and then step 108, or perform step 116 and then step 118, to implement the "avoidance cancellation processing".

Also, the embodiments described in this specification can be carried out in combination with each other.

What is claimed is:

1. A vehicle speed control device comprising:
  a parallel running vehicle detection sensor configured to set an adjacent lane as a detection area, the adjacent lane being adjacent to a traveling lane where a vehicle travels; and
  an electronic control unit configured to
    control a speed of a vehicle,
    perform cruise control for controlling the speed of the vehicle such that a predetermined cruise condition is implemented,
    perform, based on an output of the parallel running vehicle detection sensor, parallel running vehicle detection processing for detecting a parallel running vehicle traveling in the adjacent lane of the vehicle,
    perform blind zone avoidance control for controlling the speed of the vehicle such that the vehicle is moved to a position behind a blind zone of the parallel running vehicle when the parallel running vehicle is detected during execution of the cruise control,
    perform blind zone getting-out determination processing for determining whether the vehicle can move to a position ahead of the blind zone by traveling according to the cruise condition, and
    perform avoidance cancellation processing for prioritizing the control of the speed by the cruise control over the control of the speed by the blind zone avoidance control when it is determined by the blind zone getting-out determination processing that the vehicle can move to the position ahead of the blind zone,
  wherein the vehicle is prioritized to move from the position behind the blind zone of the parallel running vehicle to the position ahead of the blind zone of the parallel running vehicle when a distance between a proceeding vehicle of the vehicle in the traveling lane is greater than a sum of a target distance determined by the cruise control condition, a length of the blind zone in a traveling direction of the vehicle, and a length of the vehicle.

2. The vehicle speed control device according to claim 1, further comprising an inter-vehicle distance sensor configured to detect an inter-vehicle distance between the vehicle and the preceding vehicle of the vehicle in the traveling lane, wherein the cruise control includes tracking cruise control for causing the vehicle to travel by tracking the preceding vehicle, the cruise condition includes a condition for setting the inter-vehicle distance as the target distance, and the blind zone getting-out determination processing includes processing for determining, when a current inter-vehicle distance between the vehicle and the preceding vehicle is larger than a sum of the target distance and the length of the blind zone in the traveling direction of the vehicle, that the vehicle can move to the position ahead of the blind zone.

3. The vehicle speed control device according to claim 1, further comprising an inter-vehicle distance sensor configured to detect an inter-vehicle distance between the vehicle and a preceding vehicle of the vehicle in the traveling lane, wherein the cruise control includes tracking cruise control for causing the vehicle to travel by tracking the preceding vehicle, the cruise condition includes a condition for setting the inter-vehicle distance as a target distance, and the blind zone getting-out determination processing includes: (i) processing for detecting a speed of the preceding vehicle; (ii) processing for detecting a speed of the parallel running vehicle; and (iii) processing for determining, when the speed of the preceding vehicle is higher than the speed of the parallel running vehicle, that the vehicle can move to the position ahead of the blind zone.

4. The vehicle speed control device according to claim 3, wherein the cruise condition includes a condition for preventing the speed of the vehicle from exceeding a specified vehicle speed, and the blind zone getting-out determination processing includes processing for determining, when the speed of the parallel running vehicle is equal to or lower than the specified vehicle speed, that the vehicle can move to the position ahead of the blind zone.

5. The vehicle speed control device according to claim 1, wherein the cruise control includes constant speed cruise control for causing the vehicle to travel at a specified vehicle speed, the cruise condition corresponding to the constant speed cruise control includes a condition for setting the speed of the vehicle to the specified vehicle speed, and the blind zone getting-out determination processing executed under the constant speed cruise control includes processing for detecting a speed of the parallel running vehicle and processing for determining, when the specified vehicle speed is higher than the speed of the parallel running vehicle, that the vehicle can move to the position ahead of the blind zone.

6. The vehicle speed control device according to claim 2, wherein the cruise control includes constant speed cruise control for causing the vehicle to travel at a specified vehicle speed, the cruise condition corresponding to the constant speed cruise control includes a condition for setting the speed of the vehicle to the specified vehicle speed, and the blind zone getting-out determination processing executed under the constant speed cruise control includes processing for detecting a speed of the parallel running vehicle and processing for determining, when the specified vehicle speed is higher than the speed of the parallel running vehicle, that the vehicle can move to the position ahead of the blind zone.

7. The vehicle speed control device according to claim 6, wherein the electronic control unit is configured to perform, during execution of the tracking cruise control:
(i) processing for determining whether there is the preceding vehicle in the traveling lane; and
(ii) processing for switching the tracking cruise control to the constant speed cruise control when the preceding vehicle has gone from the traveling lane.

* * * * *